Dec. 30, 1947.  G. R. GIBSON  2,433,659
EDGER AND TRIMMER
Filed Sept. 12, 1945  2 Sheets-Sheet 1
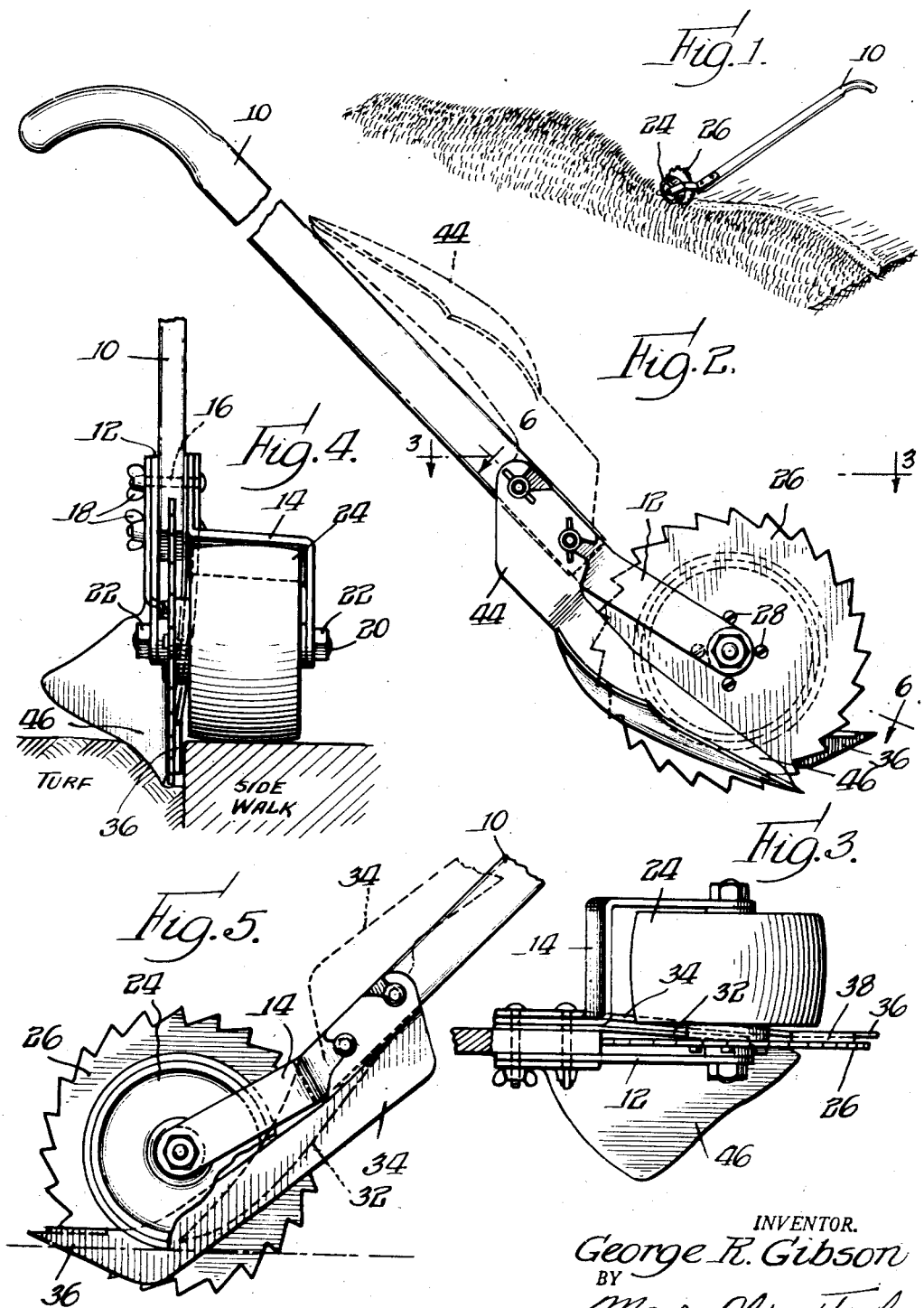
INVENTOR.
George R. Gibson
BY
Moore, Olson & Trexler
attys.

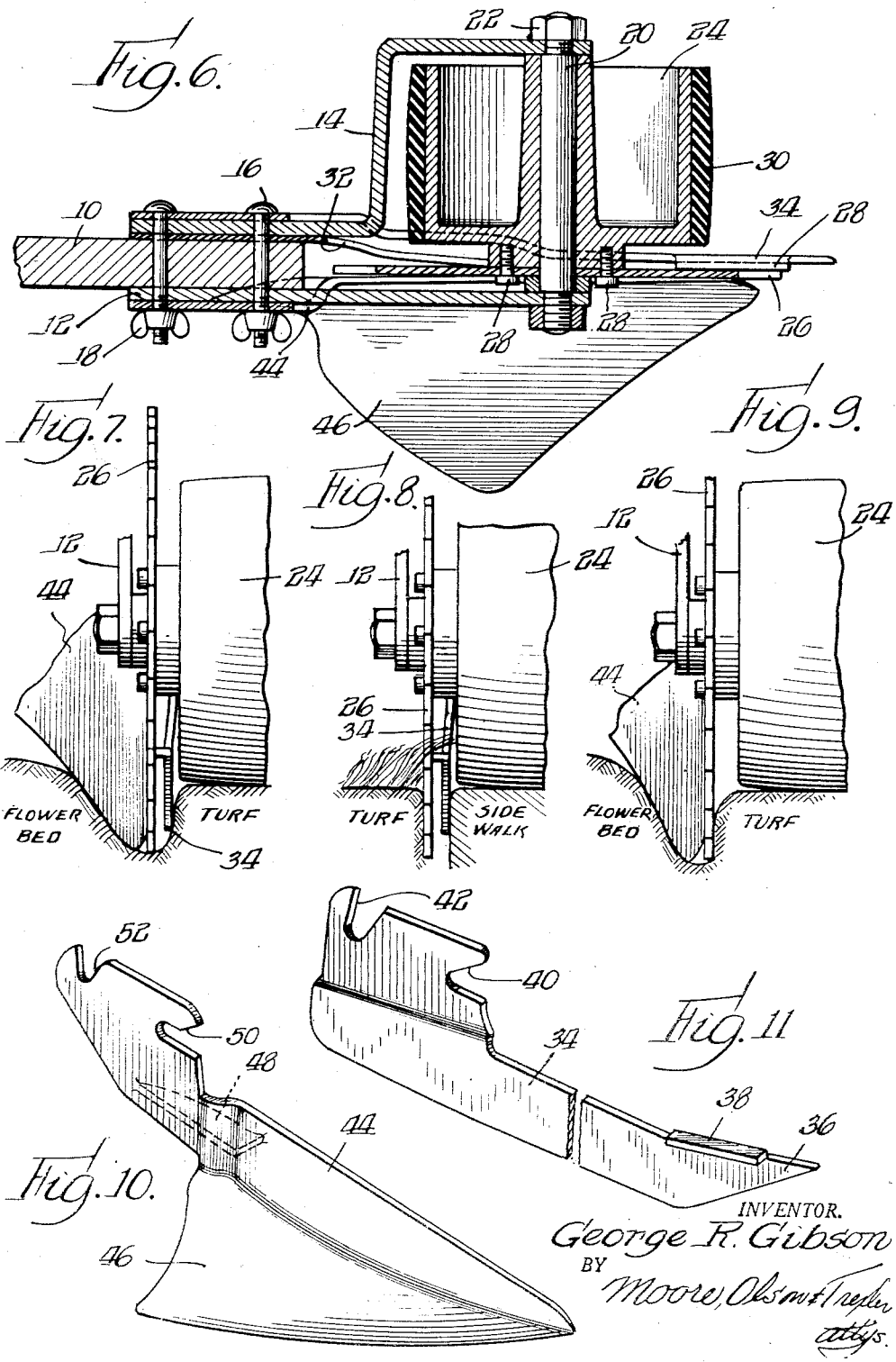

Patented Dec. 30, 1947

2,433,659

UNITED STATES PATENT OFFICE 2,433,659

EDGER AND TRIMMER

George R. Gibson, South Holland, Ill.

Application September 12, 1945, Serial No. 615,863

2 Claims. (Cl. 97—227)

The present invention relates to an edger and trimmer for lawns, and more particularly to an improved edger or trimmer which is so versatile that it may be used for numerous purposes and under different conditions.

Heretofore edgers and trimmers for lawns have been devised primarily for cutting the lawn adjacent a sidewalk or curbing. Such edgers have been particularly constructed for such purpose and hence have not been adaptable in edging a lawn at other places, as, for instance, around flower beds. Particularly, the prior lawn edgers have been constructed so as to operate only when guided by a relatively rigid and straight edge of a side-walk. It is, therefore, highly desirable to provide an improved type of edger which can be used for trimming the lawn adjacent flower beds and which may be used with or without the usual grooving plow.

It, therefore, is an object of the present invention to provide an improved edger and trimmer for lawns which will overcome certain of the above mentioned disadvantages of the prior art.

Still another object of the present invention is to provide an improved edger and trimmer suitable for trimming edges of lawns and fringes of grass along side-walks, curbs, around trees and flower beds.

Still another object of the present invention is to provide an improved edger and trimmer for lawns having removable implements so as to be suitable for the performance of different types of edging or grooving.

Other and further objects of the invention subsequently will become apparent by reference to the following description taken in connection with the following drawing wherein—

Figure 1 is a perspective view of the tool being employed along the non-linear edge of a flower bed.

Figure 2 is a side view of the edger constructed in accordance with the present invention;

Figure 3 is a top view of the edger as seen from above in the direction of the arrows along the line 3—3 of Figure 2;

Figure 4 is a right-hand view of the edger as seen in Figure 2;

Figure 5 is a back view of the edger shown in Figure 2;

Figure 6 is a cross-sectional view of the edger as seen in the direction of the arrows along the line 6—6 of Figure 2;

Figure 7 is a partial view showing certain details of the structure as used for edging along a flower bed;

Figure 8 shows one manner of using the tool for clipping the grass along the edge of a side-walk;

Figure 9 is a partial view showing another manner of using the tool along the edge of a flower bed;

Figure 10 is a perspective view of the moldboard plow member; and

Figure 11 is a perspective view of the stationary cutter.

Referring more particularly to Figures 2, 3 and 4, there is shown a lawn edger and trimmer having a handle 10 which carries at its lower end supporting brackets 12 and 14 secured in position by a pair of bolts 16 provided with wing nuts 18. The brackets 12 and 14 carry a shaft 20 held in position by suitable nuts 22. The shaft carries a driving roller 24 and a toothed cutter wheel 26. The cutter wheel is rigidly secured to the driving roller 24 by a plurality of fastening devices, such as the cap screws 28. Preferably the driving roller 24 is of the type having a crowned surface which may be formed of a resilient material 30, as is apparent from Figure 6. This surface may comprise rubber bonded directly to the cylindrical outer surface of the driving wheel or roller 24.

Interposed between the handle 10 and the support bracket 14 is a cleaning and scraping member 32, preferably formed so as to be somewhat resilient, so as to engage the surface of the cutter wheel 26 between the cutter wheel and the driving roller 24. This member 32 serves to keep clean the surface of the wheel 26 which cooperates with a stationary cutter member.

A stationary cutter member 34, best shown in Figures 5, 6 and 11, has a forwardly extending point 36. Adjacent the point 36 a right-angled projection 38 is formed to serve as a stationary cutting surface for cooperation with the teeth of the cutter wheel 26. The member 34 is secured in position under the heads of the bolts 16. In order to permit the removal of the member 34 without removing the bolts 16, that is by merely loosening the wing nuts 18, the member 34 is provided with a pair of notches 40 and 42. By loosening the wing nuts 18, the cutter member 34 may be manipulated so as to be removed from under the heads of the bolts 16 and replaced in the position shown in dotted lines in Figure 5. This arrangement is provided in the event that it is desired to use the tool in the manner shown in Figure 9, where the principal objective is to form a groove along the edge of the turf around the flower bed by use of a mold-board plow member 44.

The mold-board plow member 44, as best seen in Figure 10, has a mold-board portion 46 so formed that the leading edge of the member 42 plows a groove in the turf or soil, and the earth is moved upwardly and outwardly away from the edger and trimmer. The plow member 44 is provided with a reinforcement 48 arranged perpendicularly to the upright or vertical portion of the plow member. The plow member 44 is secured to the edger adjacent the bracket member 12 underneath the wing nuts 18 by the notches 50 and 52. If desired, the plow member may be removed and positioned in the dotted line representation shown in Figure 2, where it is desired to use the tool in the manner illustrated in Figure 8.

As previously mentioned, the tool is particularly suited for various different types of work and especially for edging along irregular surfaces such as the flower bed shown in Figure 1 and Figure 7. The Figure 7 is a front view showing the employment of the tool with both the stationary cutter bar 34 and the plow member 44. Where it is desired merely to clip the grass, as at the edge of a sidewalk or under similar conditions, the plow member 44 may be moved to the dotted line position shown in Figure 2, and the tool used merely to clip the overhanging grass, as shown in Figure 8. Where it is desired merely to deepen or form a groove without clipping grass, the stationary cutter 34 may be moved to the dotted line position shown in Figure 5 and the tool used in the manner illustrated in Figure 9. The crowned roller 24 provides a proper frictional engagement with both the turf and the sidewalk. The crown configuration permits the tool to be used in non-linear directions, as around curved walks and curved flower beds.

While for the purposes of illustrating and describing the present invention, a preferred embodiment has been shown in the drawings, it is to be understood that such variations in the arrangement of the components and in their construction are contemplated as may be commensurate with the spirit and scope of the invention set forth in the following claims.

The invention is hereby claimed as follows:

1. An edger and trimmer comprising a handle having at the end thereof a supporting bracket, a crowned driving roller wheel having a resilient friction surface, a toothed cutter wheel of a diameter larger than said driving wheel secured thereto, means supporting said driving wheel and said cutter wheel on said bracket, a removable stationary cutter bar mounted on one side of said bracket and extending between said wheels in engagement with said cutter wheel, and a removable mold-board plow member mounted on the other side of said bracket adjacent the outside of said cutter wheel, said plow member having a forward edge extending below and ahead of the lowermost tooth of said cutter wheel.

2. An edger and trimmer comprising a handle, a supporting bracket located adjacent the end of said handle, a pair of bolts and wing nuts for securing said bracket to the end of said handle, a crowned driving roller wheel having a resilient rim, a toothed cutter wheel of a diameter larger than said driving wheel rigidly secured thereto, a shaft for mounting said roller wheel on said supporting bracket, a cleaning scraper rigidly secured to said handle by said bolts and nuts and formed so as to be in resilient engagement with said cutter wheel, a removable stationary cutter bar mounted on one side of said bracket and extending between said wheels in engagement with the toothed portion of said cutter wheel, a removable mold-board plow member mounted on the other side of said bracket and extending to the outside of said cutter wheel, said plow member having a forward edge extending below said toothed cutter wheel, said plow member and said cutter bar each having notched securing portions arranged to be engaged by said pair of bolts and wing nuts for selective disengagement from said tool without the removal of said bolts from said frame and said handle.

GEORGE R. GIBSON.

REFERENCES CITED

The following references are of record in the file of this patent:

UNITED STATES PATENTS

| Number | Name | Date |
| --- | --- | --- |
| 1,901,992 | Smith | Mar. 21, 1933 |
| 1,065,946 | Janson | July 1, 1913 |
| 340,420 | Coldwell | Apr. 20, 1886 |
| 1,883,817 | Olsen | Oct. 18, 1932 |
| 1,488,520 | White | Apr. 1, 1924 |